(12) United States Patent
Tyebkhan et al.

(10) Patent No.: US 10,277,688 B2
(45) Date of Patent: Apr. 30, 2019

(54) AUTOMATIC INSTALLATION ACTIVATION SELECTION FOR HOSTED SERVICES

(71) Applicant: MICROSOFT TECHNOLOGY LICENSING, LLC, Redmond, WA (US)

(72) Inventors: Arwa Tyebkhan, Redmond, WA (US); Christopher Lomond, Seattle, WA (US); Carlos Perez, Redmond, WA (US); Max S. Lustig, Seattle, WA (US); Jason F. Moore, Redmond, WA (US); Randy B. Wong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 15/398,443

(22) Filed: Jan. 4, 2017

(65) Prior Publication Data
US 2018/0191841 A1 Jul. 5, 2018

(51) Int. Cl.
*G06F 15/16* (2006.01)
*G06F 15/173* (2006.01)
(Continued)

(52) U.S. Cl.
CPC .......... *H04L 67/16* (2013.01); *H04L 41/0853* (2013.01); *H04L 41/0886* (2013.01); *H04L 67/34* (2013.01); *H04L 67/36* (2013.01)

(58) Field of Classification Search
CPC ...... H04L 67/16; H04L 67/34; H04L 41/0886
(Continued)

(56) References Cited

U.S. PATENT DOCUMENTS 8,255,868 B1   8/2012 Robalewski
9,063,757 B2   6/2015 Horton et al.
(Continued)

OTHER PUBLICATIONS

Nixon, Jerry, "Walkthrough: using Windows 8 Custom Protocol Activation", http://blog.jerrynixon.com/2012/10/walkthrough-using-windows-8-custom.html, Published on: Oct. 18, 2012, 5 pages.
(Continued)

*Primary Examiner* — Karen C Tang
(74) *Attorney, Agent, or Firm* — Michael Best & Friedrich LLP (57) ABSTRACT

Automatic installation and/or activation selection for hosted services is provided. A set-up user interface for users to sign up and activate their membership with a hosted service may prompt an activation module to analyze a computing environment of a requesting user to determine if a client application associated with the hosted service is pre-installed or not. If the client application is pre-installed, the user may be provided a control such as a button to activate the client application and begin using the hosted service. If the client application is not pre-installed, the activation module may determine which version of the client application is proper for the computing environment (e.g., operating system, operating system version, device, and similar parameters) and where it can be downloaded from. The activation module may then present the user with a link to the location for downloading and optionally installing the client application automatically.

20 Claims, 8 Drawing Sheets

(51) Int. Cl.
  *H04L 29/08* (2006.01)
  *H04L 12/24* (2006.01)
(58) Field of Classification Search
  USPC .................................................. 709/224, 217
  See application file for complete search history.

(56) References Cited

U.S. PATENT DOCUMENTS

| | | | |
|---|---|---|---|
| 9,110,679 B1* | 8/2015 | Chan | G06F 9/4411 |
| 9,348,572 B2 | 5/2016 | Farm et al. | |
| 9,477,483 B2 | 10/2016 | Longhenry et al. | |
| 2005/0273766 A1 | 12/2005 | Vetrivelkumaran et al. | |
| 2006/0161970 A1* | 7/2006 | Hopen | G06F 21/6236 |
| | | | 726/4 |
| 2008/0235680 A1 | 9/2008 | Strauss et al. | |
| 2009/0164201 A1* | 6/2009 | Celli | H04L 41/20 |
| | | | 703/21 |
| 2009/0222483 A1* | 9/2009 | Johnson | G06F 8/60 |
| 2009/0222826 A1* | 9/2009 | Johnson | G06F 8/61 |
| | | | 718/102 |
| 2010/0306762 A1* | 12/2010 | Lindberg | G06F 8/61 |
| | | | 717/176 |
| 2011/0038005 A1* | 2/2011 | Ochiai | G03G 15/5075 |
| | | | 358/1.15 |
| 2013/0047149 A1 | 2/2013 | Xu et al. | |
| 2013/0159973 A1* | 6/2013 | Ciano | G06F 8/71 |
| | | | 717/121 |
| 2013/0205250 A1* | 8/2013 | Osaka | G06F 3/0481 |
| | | | 715/803 |
| 2013/0263106 A1* | 10/2013 | Fuse | G06F 8/61 |
| | | | 717/168 |
| 2014/0012750 A1 | 1/2014 | Kuhn et al. | |
| 2014/0157387 A1* | 6/2014 | Lee | G06F 17/30309 |
| | | | 726/7 |
| 2014/0164909 A1* | 6/2014 | Graff | G06F 17/30899 |
| | | | 715/234 |
| 2015/0082291 A1* | 3/2015 | Thomas | G06F 8/65 |
| | | | 717/168 |
| 2015/0082296 A1* | 3/2015 | Thomas | G06F 8/65 |
| | | | 717/171 |
| 2016/0212012 A1* | 7/2016 | Young | H04L 41/14 |
| 2018/0150477 A1* | 5/2018 | Jewell | G06F 17/30176 |

OTHER PUBLICATIONS

"How to Launch External Applications Using Custom Protocols", https://support.shotgunsoftware.com/hc/en-us/articles/219031308-How-to-launch-external-applications-using-custom-protocols-rock-instead-of-http-, Retrieved on: Dec. 22, 2016, 11 pages.

"Launching Application from Hyperlink", http://stackoverflow.com/questions/24782934/launching-application-from-hyperlink, Retrieved Date: Dec. 22, 2016, 2 pages.

* cited by examiner

AUTOMATIC INSTALLATION ACTIVATION SELECTION FOR HOSTED SERVICES

BACKGROUND

Computing devices typically are delivered to users with an operating system and pre-installed applications and configurations. However, the pre-installed applications are limited to the most common ones or those selected by the computer manufacturer. If an application is not pre-installed, the user may have to download it from a designated website or similar source. A type of application to be installed may also vary depending on operating system, operating system version, device type, and other computing environment aspects. Thus, users may have to go through a manual process of selecting the proper application, downloading, and installing it.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatic installation and/or activation selection for hosted services. Upon receiving a request to set up a hosted service client application on a computing device, an activation module of the hosted service may analyze the computing environment at the computing device and determine whether the client application is pre-installed or needs to be downloaded for installation. The activation module may also determine which version of the client application is proper for the computing environment. Then, the activation module may present the requesting user with an activation control or a link for downloading and installing the client application based on the determination(s).

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above embodiments are directed to automatic installation and/or activation selection for hosted services. A set-up user interface for users to sign up and activate their membership with a hosted service may prompt an activation module to analyze a computing environment of a requesting user to determine if a client application associated with the hosted service is pre-installed or not. If the client application is pre-installed, the user may be provided a control such as a button to activate the client application and begin using the hosted service. If the client application is not pre-installed, the activation module may determine which version of the client application is proper for the computing environment (e.g., operating system, operating system version, device, and similar parameters) and where it can be downloaded from. The activation module may then present the user with a link to the location for downloading and optionally installing the client application automatically.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing stress feedback for a presentation. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
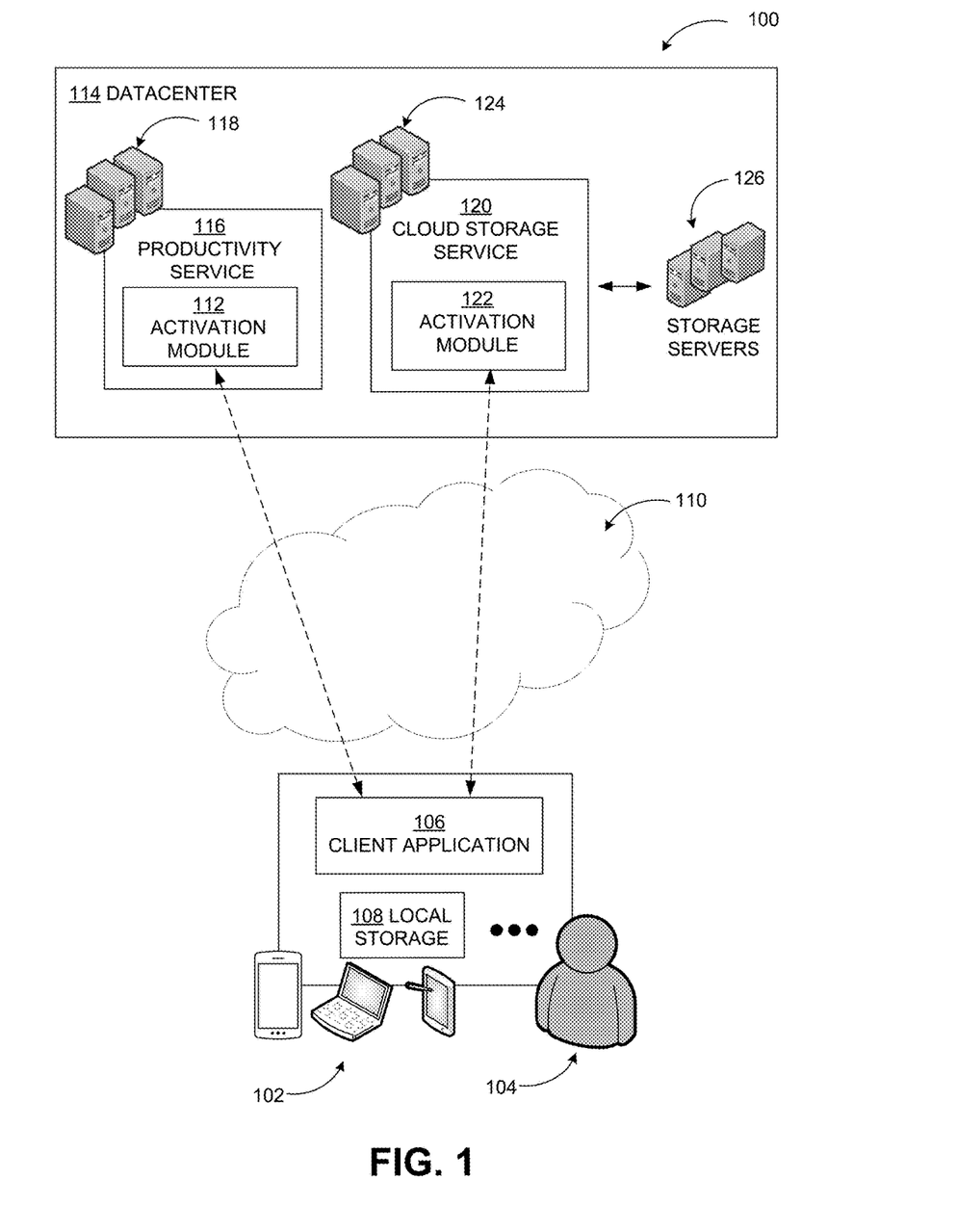
FIG. 1 includes a display diagram illustrating an example network environment where a system to provide automatic installation and/or activation selection for hosted services may be implemented.

FIG. 1 includes a display diagram illustrating an example network environment where a system to provide automatic installation and/or activation selection for hosted services may be implemented.

As illustrated in diagram 100, an example system may include a datacenter 114 hosting a productivity service 116 configured to, among other things, provide productivity services such as word processing, spreadsheets, presentations, calendar applications, etc. The datacenter may also host a cloud storage service 120, which may provide cloud storage services to users by synchronizing selected local storages (e.g. local storage 108) with cloud storage managed by storage servers 126, for example. The productivity service 116 and the cloud storage service 120 are examples of hosted services that allow users to access their services through client applications such as client application 106 executed on one or more client devices 102.

The productivity service 116 and the cloud storage service 420 may include activation modules 112 and 122, respectively. The activation modules 112 and 122 may manage activation of services for the users. In an example scenario, user 104 may visit a website associated with a hosted service such as the productivity service 116 and the cloud storage service 120 and sign up for the service. To complete the setup of the user's account with the hosted service, the respective activation module may analyze a computing environment of the user 104 to determine if the client application 106 associated with the hosted service is pre-installed or not. If the client application is pre-installed, the user may be provided a control such as a button to activate the client application and begin using the hosted service. If the client application is not pre-installed, the activation module may determine which version of the client application is proper for the computing environment and where it can be downloaded from. The activation module may then present a link to download the client application.

The productivity service 116 and the cloud storage service 120 are examples of hosted services. Other examples may include communication services, scheduling services, online conferencing services, collaboration services, and comparable ones. As described herein, the productivity service 116, the cloud storage service 120 and/or the activation modules 112, 122 may be implemented as software, hardware, or combinations thereof.

In some embodiments, the productivity service 116 or the cloud storage service 120 may be configured to intemperate with the client application 106 through the client device 102 over one or more networks, such as network 110. For example, the client application 106 may be a word processing application, a presentation application, a notebook application, or a spreadsheet application in conjunction with the productivity service 116, or the client application 106 may be a synchronization application in conjunction with the cloud storage service 120. The client device 102 may include a desktop computer, a laptop computer, a tablet computer, a vehicle-mount computer, a smart phone, or a wearable computing device, among other similar devices.

A technical effect of automatic installation ands or activation selection for hosted services may include allowing users to access hosted service in an efficient manner. By determining proper activation or installation options automatically, processing and network capacity may be preserved (e.g., by avoiding unnecessary downloading when an application is pre-installed). Embodiments may further improve usability and increase user interactivity.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users activating client applications for hosted services.

Figure 2:
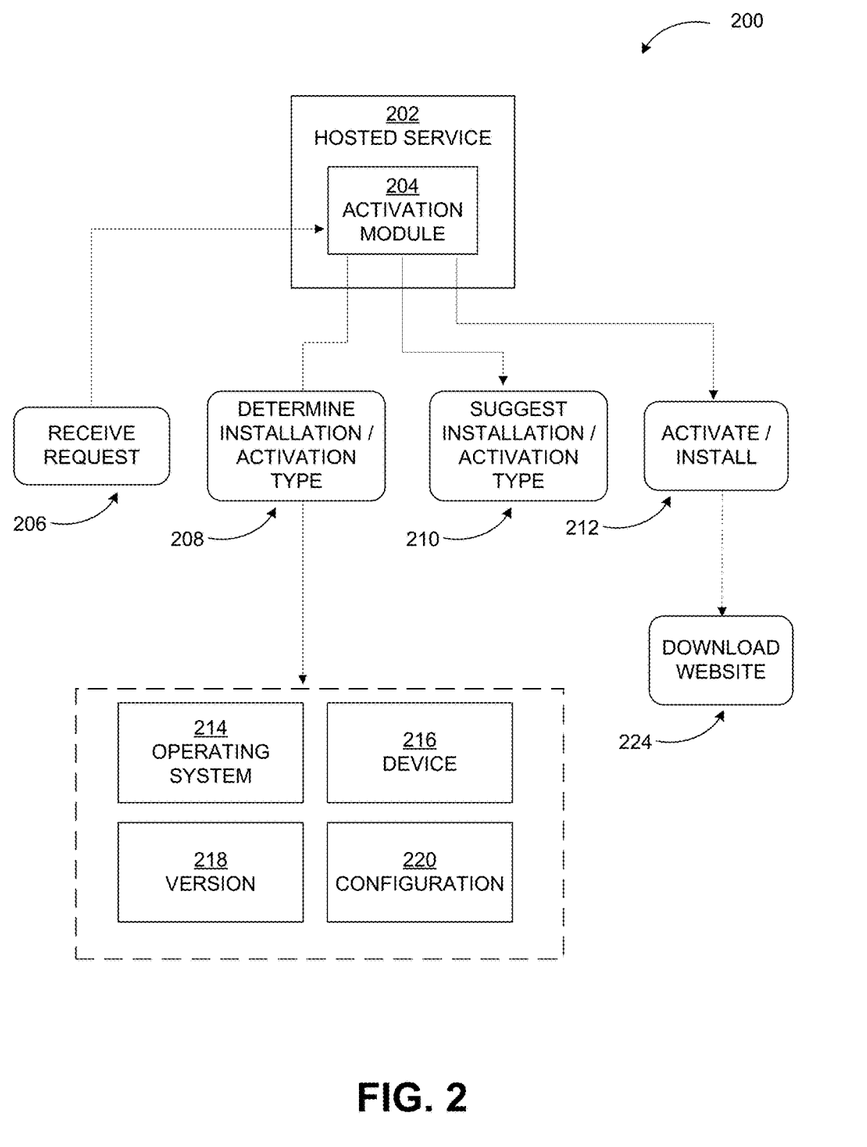
FIG. 2 includes a display diagram illustrating an example set of actions and components in implementing automatic installation and/or activation selection for hosted services.

FIG. 2 includes a display diagram illustrating an example set of actions and components in implementing automatic installation and/or activation selection for hosted services.

As shown in diagram 200, an activation module 204 of a hosted service 202 may receive a request 206 from a user to sign up for the hosted service 202. The hosted service 202 may require a client application to be executed on the user's computing device. In response to the request, the activation module 204 may perform and analysis of the user's computing environment to determine an installation/activation type. The computing environment may include an operating system 214, operating system version 218, the physical client device 216, and a configuration 220 of the hardware and software components on the client device 216. If the client application is pre-installed at the client device 216, the activation module 204 may suggest activation of the client application or automatically activate 212 the client application. In some examples, the activation module 204 may select/set configuration parameters of the client application based on the analysis of the computing environment.

If the client application is not pre-installed, the activation module 204 may determine which type/version of client application is needed based on the analysis of the computing environment, and provide a link for downloading the determined type/version of the client application 210. In some examples, the activation module 204 may manage the download and installation of the client application 212 automatically in conjunction with a website 224, from which the client application is to be downloaded.

Figure 3:
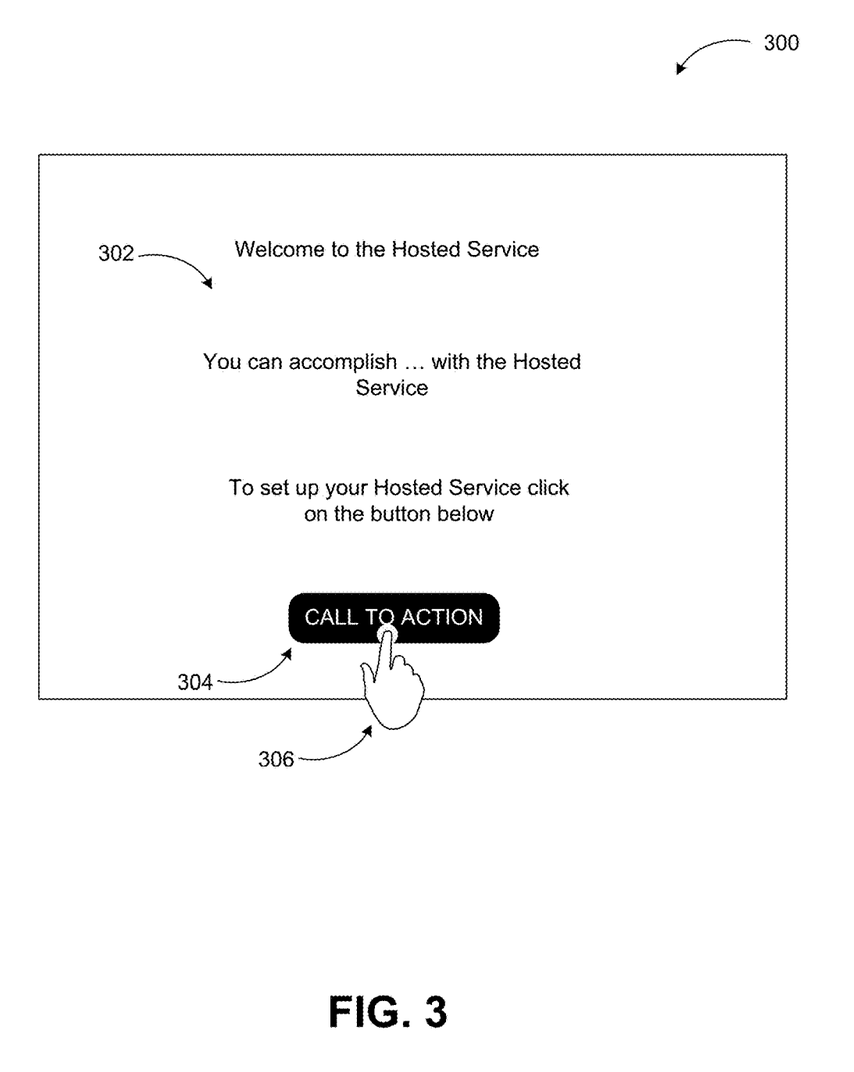
FIG. 3 includes a display diagram illustrating an example user interface for setting up a hosted service on a computing device.

FIG. 3 includes a display diagram illustrating an example user interface for setting up a hosted service on a computing device.

Diagram 300 is a user interface of an example hosted service for signing up or setting up the service for a user. The sign-up/set-up user interface may be managed by the activation module of the hosted service. The user interface may include information 302 welcoming the user to the hosted service and provide a control 304 (e.g., a call-to-action button).

Upon selection 306 of the control 304, the activation module may perform the analysis of the user's computing environment as discussed above. The analysis may include querying various software and hardware components of the client device such as the operating system, a registry of the client device. The activation module may infer the computing environment information from received data or receive the information directly if standardized and predefined interfaces/protocols are used.

Based on the analysis, the activation module may determine whether to activate a pre-installed client application or (prompt the user) to download the client application from a networked source. As discussed above, the activation module may also manage/assist manual or automatic configuration of the client application.

Figure 4:
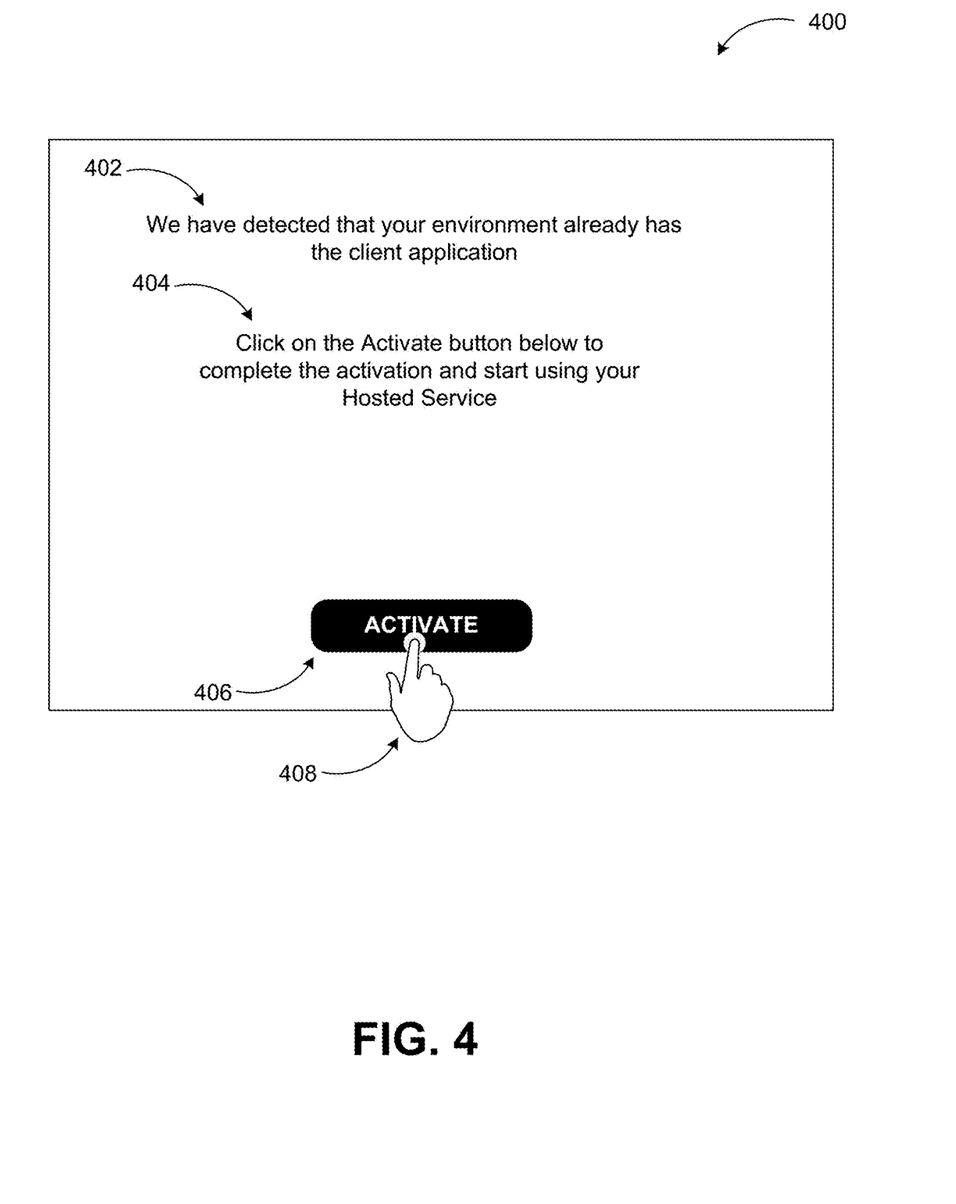
FIG. 4 includes a display diagram illustrating an example user interface for activating a pre-installed client application associated with a hosted service.

FIG. 4 includes a display diagram illustrating an example user interface for activating a pre-installed client application associated with a hosted service.

Diagram 400 is another user interface of the hosted service to prompt the user to activate a pre-installed client application based on the determination discussed above. The activation module may inform the user that the pre-installed client application has been detected (402) and the user can begin activation (404) upon selection 408 of the activation control 406.

In case of configuration selection/setting, additional information associated with available options or selections may also be displayed. Yet, in other examples, the activation module may automatically activate the pre-installed client application and take the user directly to a teaching user interface to begin using the hosted service.

Figure 5:
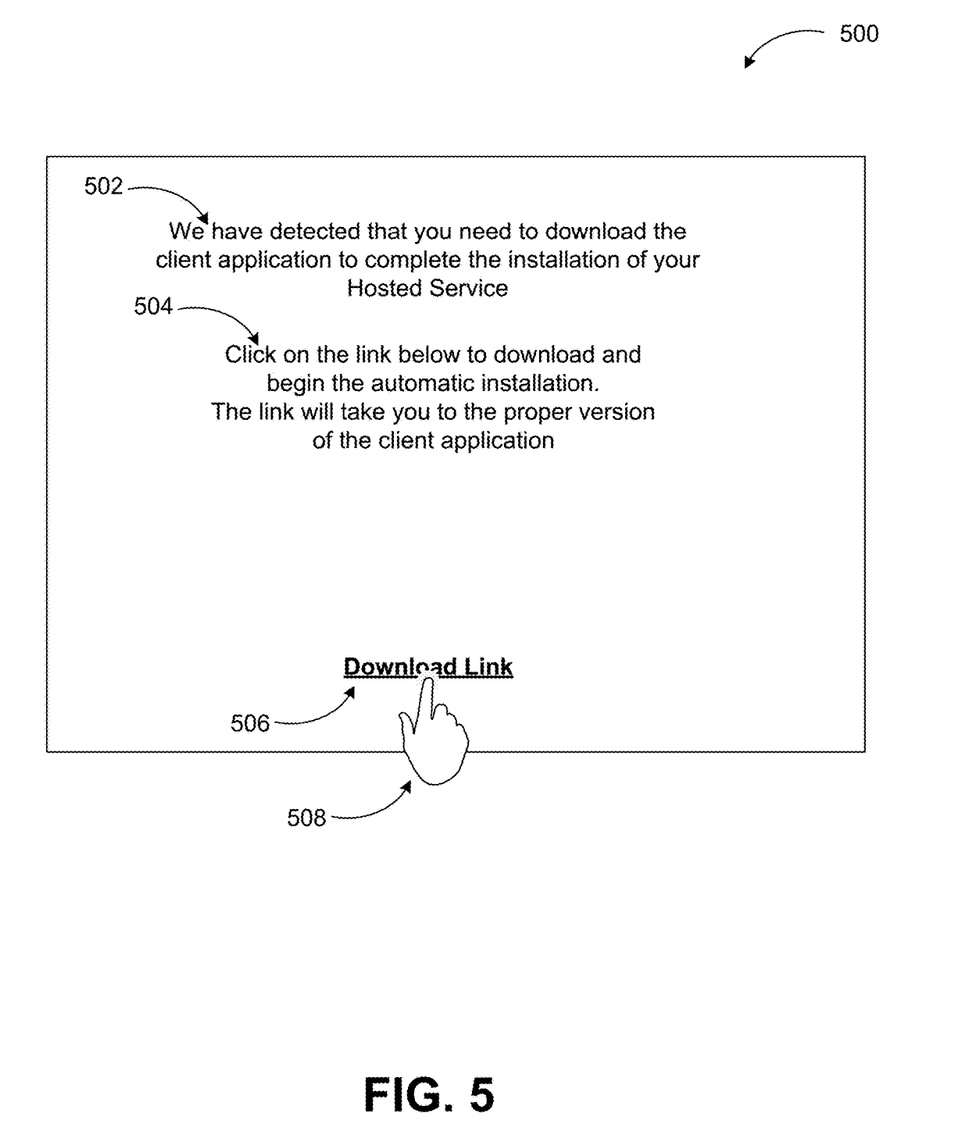
FIG. 5 includes a display diagram illustrating an example user interface for installing a client application associated with a hosted service.

FIG. 5 includes a display diagram illustrating an example user interface for installing a client application associated with a hosted service.

Diagram 500 is a further user interface that may be displayed to the user upon determination that the client application is not pre-installed or a new version is needed to set up the hosted service. Thus, in addition to informing the user (502) that the client application needs to be downloaded, the activation module may instruct the user (504) to select 508 a displayed link 506 in order to initiate the download process. As mentioned above, the client application may be downloaded, configured, and/or activated automatically based on the analysis results and/or user input.

The examples provided in FIGS. 1 through 5 are illustrated with specific systems, services, applications, modules, and displays. Embodiments are not limited to environments according to these examples. Automatic installation and/or activation selection for hosted services may be implemented in environments employing fewer or additional systems, services, applications, modules, and displays. Furthermore, the example systems, services, applications, modules, and notifications shown in FIG. 1 through 5 may be implemented in a similar manner with other user interface or action flow sequences using the principles described herein.

Figure 6:
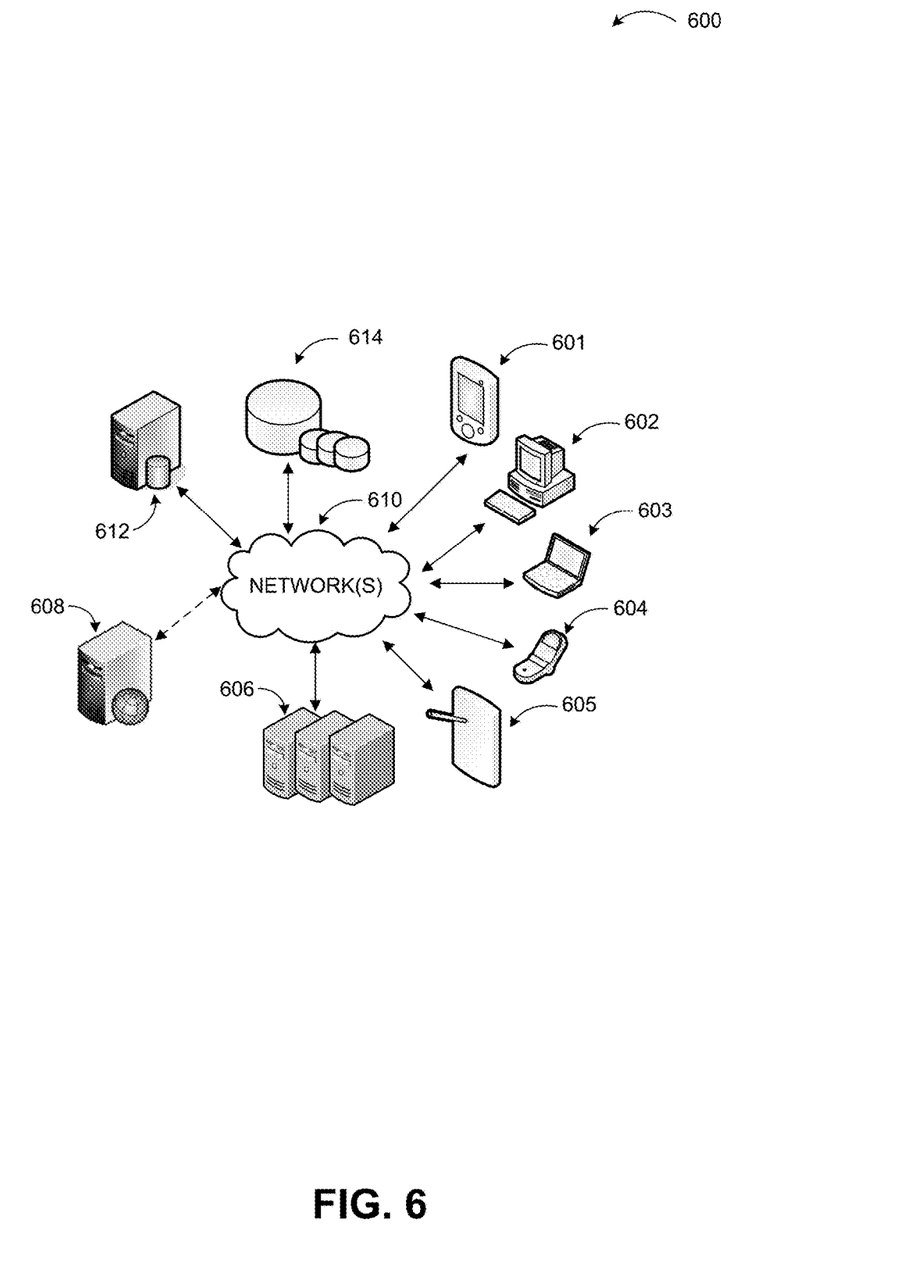
FIG. 6 is a networked environment, where a system according to embodiments may be implemented.

FIG. 6 is a networked environment, where a system according to embodiments may be implemented. An activation module as described herein may be employed in conjunction with hosted applications and services (for example, a hosted service 120) that may be implemented via software executed over one or more servers 606 or individual server 608, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, unsecure network, such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed to provide automatic installation and/or activation selection for hosted services. Furthermore, the networked environments discussed in FIG. 6 are for illustration purposes only. Embodiments are not limited to the example applications, engines, or processes.

Figure 7:
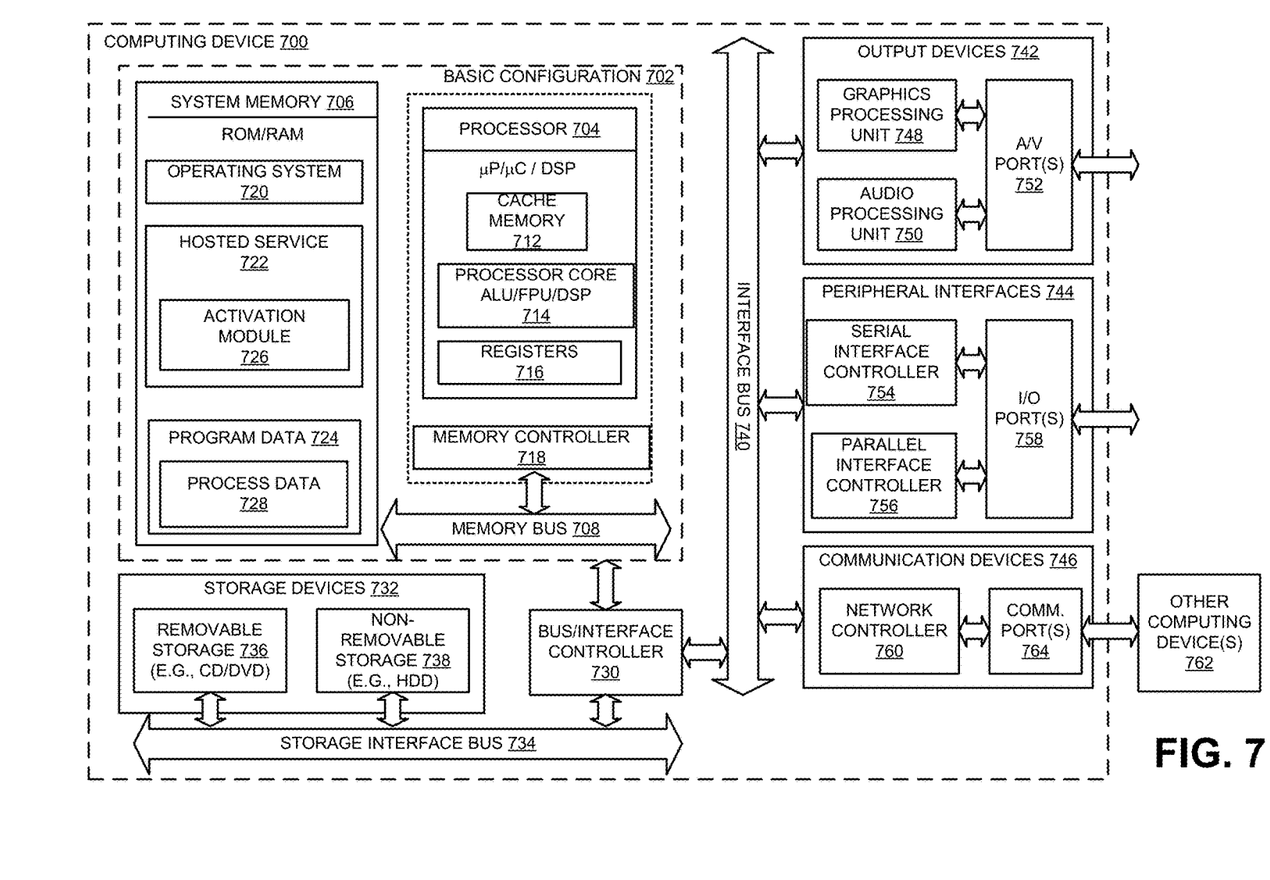
FIG. 7 is a block diagram of an example general purpose computing device, which may be used to provide automatic installation and/or activation selection for hosted services.

FIG. 7 is a block diagram of an example general purpose computing device, which may be used to provide automatic installation and/or activation selection for hosted services.

For example, computing device 700 may be used as a server, desktop computer, portable computer, smart phone, special purpose, computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including hut not limited to volatile memory (such as RAM), non-volatile memory (such as ROM, flash memory, etc.) or any combination thereof. The system memory 706 may include an operating system 720, a hosted service 722, and program data 724. The hosted service 722 may include an activation module 726, which may be an integrated module of the hosted service 722. The activation module 726 may be configured to analyze a computing environment of a user to determine if a client application associated with the hosted service is pre-installed or not. If the client application is pre-installed, the user may be provided a control such as a button to activate the client'application and begin using the hosted service. If the client application is not pre-installed, the activation module may determine which version of the client application is proper for the computing environment and where it can be downloaded from. The program data 724 may include, among other data, process data 728, such as the user information, hosted service information, etc., as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such, as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory, technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide automatic installation and/or activation selection for hosted services. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
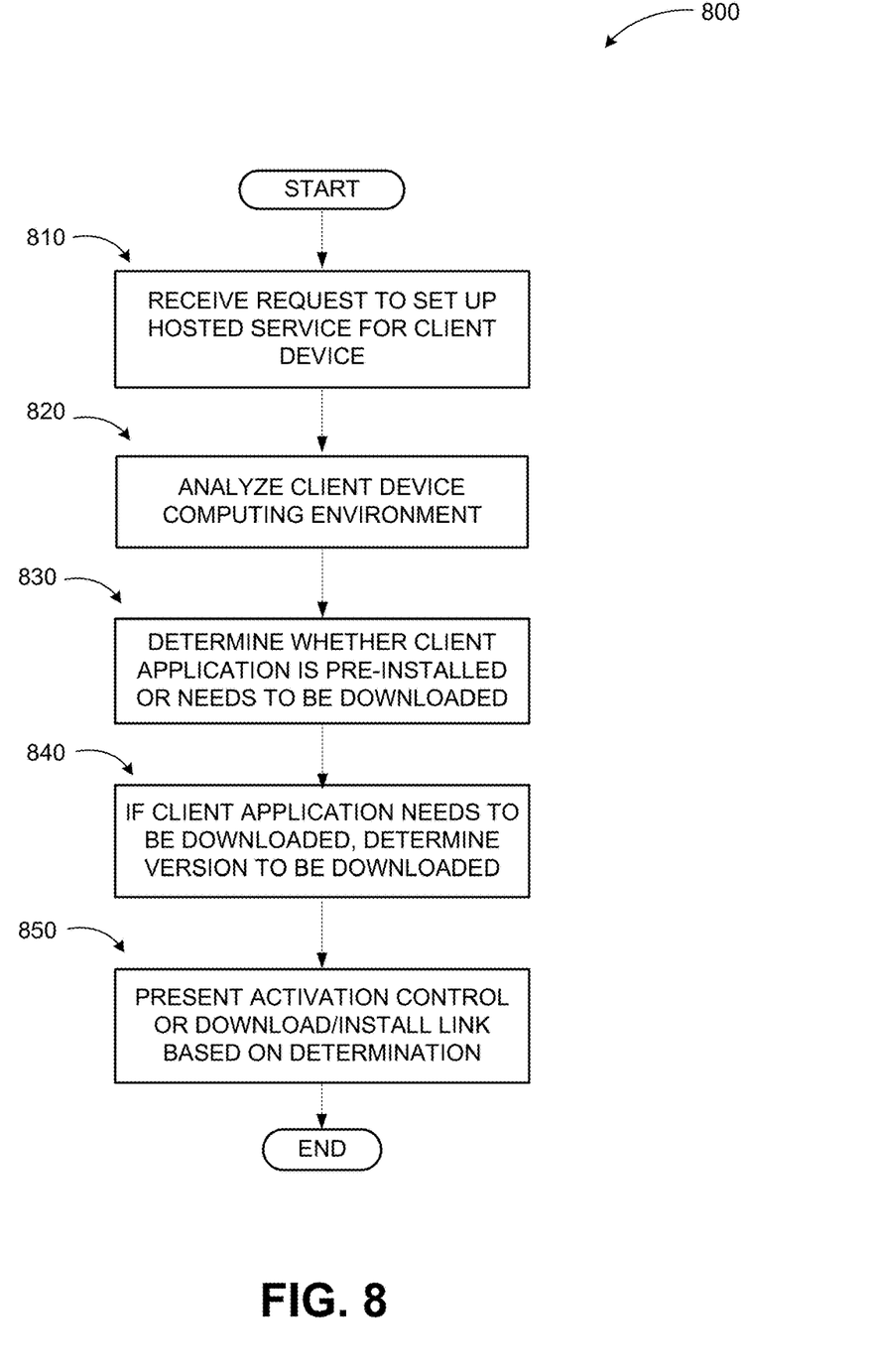
FIG. 8 illustrates a logic flow diagram of a method to provide automatic installation and/or activation selection for hosted services, arranged in accordance with at least some embodiments described herein.

FIG. 8 illustrates a logic flow diagram of a method to provide automatic installation and/or activation selection for hosted services. Process 800 may be implemented on a computing device, server, or other system. An example server may comprise a communication interface to facilitate communication between one or more client devices and the server. The example server may also comprise a memory to store instructions, and one or more processors coupled to the memory. The processors, in conjunction with the instructions stored on the memory, may be configured to provide automatic installation and/or activation selection for hosted services.

Process 800 begins with operation 810, where a request may be received by the hosted service for set up at a client device. The hosted service may provide its services through a thick (locally installed client application) or a thin (browser based) client application. In case of thick client applications, some operating systems and devices may include the client application as a pre-installed application to be activated.

At operation 820, an activation module of the hosted service may analyze the computing environment of the client device. The computing environment may include the operating system, a version of the operating system, the physical client device (e.g., whether the device is a desktop computer, a mobile computer, a vehicle-mount computer, and so on). The computing environment may further include other software and hardware aspects such as available memory or storage, processing capacity, network connectivity, and similar ones.

At operation 830, the activation module may determine whether the client application is pre-installed or needs to be downloaded. If the client application is to be downloaded, the activation module may further determine which version of the client application is to be downloaded at operation 840. The activation module may further determine details for the installation/activation of the client application such as configuration specifics.

At operation 850, the activation module may present an activation control or a link to download the client application based on the determinations. In some cases, the activation module may manage automatic downloading and installation of the proper version of the client application.

The operations included in process 800 are for illustration purposes. Automatic installation and/or activation selection for hosted services may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means fir providing automatic installation or activation selection for hosted services is described. The means may include a means for receiving a request to set up interactivity with a hosted service on a client device; a means for analyzing a computing environment associated with the client device; a means for determining whether a client application to provide the interactivity is pre-installed on the client device; a means for providing a prompt to be displayed through the client device to activate the pre-installed client application if the client application is pre-installed; a means for determining a networked source to download the client application from if the client application is not pre-installed; and a means for providing another prompt to be displayed through the client device to download the client application from the networked source.

According to some examples, a method to provide automatic installation or activation selection for hosted services is described. The method may include receiving a request to set up interactivity with a hosted service on a client device; analyzing a computing environment associated with the client device; determining whether a client application to provide the interactivity is pre-installed on the client device; if the client application is pre-installed, providing a prompt to be displayed through the client device to activate the pre-installed client application; if the client application is Dot pre-installed, determining a networked source to download the client application from; and providing another prompt to be displayed through the client device to download the client application from the networked source.

According to other examples, analyzing the computing environment may include determining one or more of an operating system of the client device, a version of the operating system, a type of the client device. The type of the client device may include a server, a desktop computer, a laptop computer, a tablet computer, a vehicle-mount computer, a smart phone, or a wearable computing device. Analyzing the computing environment may further include determining one or more of a software configuration and a hardware configuration of the client device. The software configuration and the hardware configuration may include one or more of an available memory, an available storage, a processing capacity, and a network connectivity associated with the client device.

According to further examples, the method may include one or more of determining a configuration for the client application based on the analysis; automatically configuring the pre-installed client application; automatically configuring the client application upon downloading in response to selection of the other prompt; and automatically downloading, configuring, and activating the client application.

According to other examples, a server configured to provide automatic installation or activation selection for hosted services is described. The server may include a communication interface configured to facilitate communication between a client device and the server; a memory configured to store instructions; and one or more processors coupled to the memory, where the one or more processors, in conjunction with the instructions stored in the memory, execute an activation module of a hosted service. The activation module may be configured to receive a request to set up interactivity with a hosted service on a client device; analyze a computing environment associated with the client device; determine whether a client application to provide the interactivity is pre-installed on the client device; if the client application is pre-installed, automatically activate the pre-installed client application or provide a prompt to be displayed through the client device to activate the pre-installed client application; if the client application is not pre-installed, determine a networked source to download the client application from; and automatically download the client application from the networked source or provide another prompt to be displayed through the client device to download the client application from the networked source.

According to some examples, the activation module may be configured to analyze the computing environment by querying one or more software and hardware components of the client device. The one or more software and hardware components of the client device may include an operating system, a registry, or a configuration module of the client device. The activation module may be configured to analyze the computing environment by receiving information through one or more of a predefined application programming interface and a predefined protocol from one or more software and hardware components of the client device. The hosted service may include a productivity service, a cloud storage service, a communication service, a scheduling service, an online conferencing service, or a collaboration service.

According to further examples, a system to provide automatic installation or activation selection for a cloud storage service is described. The system may include one or more storage servers configured to manage cloud data stores; and a management server hosting the cloud storage service. The management server may include a communication interface configured to facilitate communication between the storage servers, the management server, and a plurality of client devices; a memory configured to store instructions; and one or more processors coupled to the memory, where the one or more processors, in conjunction with the instructions stored in the memory, execute an activation module of the cloud storage service. The activation module may be configured to receive a request to set up interactivity with the cloud storage service on a client device; analyze a computing environment associated with the client device; determine whether a client application to provide the interactivity is pre-installed on the client device; if the client application is pre-installed, automatically activate the pre-installed client application or provide a prompt to be displayed through the client device to activate the pre-installed client application; if the client application is not pre-installed, determine a networked source to download the client application from; and automatically download the client application from the networked source or provide another prompt to be displayed through the client device to download the client application from the networked source.

According to some examples, the activation module may be further configured to determine a version of the client application to be downloaded based on the analysis; and determine the networked source according to the version of the client application. The client application may be a synchronization application. The activation module may be further configured to determine a configuration for the client application based on the analysis; and configure the client application prior to activation. The computing environment may include one or more of an operating system of the client device, a version of the operating system, a type of the client device, an available memory, associated with the client device, an available storage associated with the client device, a processing capacity associated with the client device, and a network connectivity associated with the client device. The activation module may be configured to interact with a signing up user through a user interface of the cloud storage service.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide automatic installation or activation selection for hosted services, the method comprising:
   receiving a request to set up interactivity with a hosted service on a client device;
   analyzing a computing environment associated with the client device;
   determining whether a client application to provide the interactivity is pre-installed on the client device;
   in response to determining the client application is pre-installed on the client device,
      determining whether a version of the client application pre-installed on the client device is sufficient to provide the hosted services;
      in response to determining the version of the client application pre-installed on the client device is sufficient to provide the hosted services, providing a first prompt to be displayed through the client device to activate the pre-installed client application; and
      in response to determining the version of the client application pre-installed on the client device is insufficient to provide the hosted services, providing a second prompt to be displayed through the client device to download a different version of the client application than the version of the client application pre-installed on the client device;
   and
   in response to determining the client application is not pre-installed on the client device,
      determining a networked source providing the client application for download; and
      providing a third prompt to be displayed through the client device to download the client application from the networked source.

2. The method of claim 1, wherein analyzing the computing environment comprises:
   determining one or more of an operating system of the client device, a version of the operating system, a type of the client device.

3. The method of claim 2, wherein the type of the client device is one of a server, a desktop computer, a laptop computer, a tablet computer, a vehicle-mount computer, as smart phone, and a wearable computing device.

4. The method of claim 2, wherein analyzing the computing environment further comprises:
   determining one or more of a software configuration and a hardware configuration of the client device.

5. The method of claim 4, wherein the software configuration and the hardware configuration include one or more of an available memory, an available storage, a processing capacity, and a network connectivity associated with the client device.

6. The method of claim 1, further comprising:
   determining a configuration for the client application based on the analysis.

7. The method of claim 6, further comprising:
   automatically configuring the pre-installed client application.

8. The method of claim 6, further comprising:
   automatically configuring the client application upon downloading the client application from the networked source in response to selection of the third prompt.

9. The method of claim 6, further comprising:
   automatically downloading, configuring, and activating the client application in response to selection of the third prompt.

10. A server configured to provide automatic installation or activation selection for hosted services, the server comprising:
    a communication interface configured to facilitate communication between a client device and the server;
    a memory configured to store instructions; and
    one or more processors coupled to the memory, wherein the one or more processors, in conjunction with the instructions stored in the memory, execute an activation module of a hosted service, the activation module configured to:
       receive a request to set up interactivity with a hosted service on a client device;
       analyze a computing environment associated with the client device;
       determine whether a client application to provide the interactivity is pre-installed on the client device;
       in response to determining the client application is pre-installed on the client device,
          determine whether a version of the client application pre-installed on the client device is sufficient to provide the hosted services;
          in response to determining the version of the client application pre-installed on the client device is sufficient to provide the hosted services, automatically activate the pre-installed client application on the client device or provide a first prompt to be displayed through the client device to activate the pre-installed client application; and
          in response to determining the version of the client application pre-installed on the client device is insufficient to provide the hosted services, provide a second prompt to be displayed through the client device to download a different version of the client application than the version of the client application pre-installed on the client device; and
       in response to determining the client application is not pre-installed on the client device,
          determine a networked source providing the client application for download; and
          automatically download the client application from the networked source or provide a third prompt to be displayed through the client device to download the client application from the networked source.

11. The server of claim 10, wherein the activation module is configured to analyze the computing environment by querying one or more software and hardware components of the client device.

12. The server of claim 11, wherein the one or more software and hardware components of the client device include an operating system, a registry, or a configuration module of the client device.

13. The server of claim 10, wherein the activation module is configured to analyze the computing environment by receiving information through one or more of a predefined application programming interface and a predefined protocol from one or more software and hardware components of the client device.

14. The server of claim 10, wherein the hosted service is one of: a productivity service, a cloud storage service, a communication service, a scheduling service, an online conferencing service, and a collaboration service.

15. A system to provide automatic installation or activation selection for a cloud storage service, the system comprising:
   one or more storage servers configured to manage cloud data stores; and
   a management server hosting the cloud storage service, the management server comprising:
      a communication interface configured to facilitate communication between the storage servers, the management server, and a plurality of client devices;
      a memory configured to store instructions; and one or more processors coupled to the memory, wherein the one or more processors, in conjunction with the instructions stored in the memory, execute an activation module of the cloud storage service, the activation module configured to:
         receive a request to set up interactivity with the cloud storage service on a client device;
         analyze a computing environment associated with the client device;
         determine whether a client application to provide the interactivity is pre-installed on the client device;
         in response to determining the client application is pre-installed on the client device,
            determine whether a version of the client application pre-installed on the client device is sufficient to provide the hosted services;
            in response to determining the version of the client application pre-installed on the client device is sufficient to provide the hosted services, automatically activate the pre-installed client application on the client device or provide a first prompt to be displayed through the client device to activate the pre-installed client application;
            in response to determining the version of the client application pre-installed on the client device is insufficient to provide the hosted services, provide a second prompt to be displayed through the client device to download a different version of the client application than the version of the client application pre-installed on the client device; and
         in response to determining the client application is not pre-installed on the client device,
            determine a networked source providing the client application for download; and
            automatically download the client application from the networked source or provide a third prompt to be displayed through the client device to download the client application from the networked source.

16. The system of claim 15, wherein the activation module is further configured to, in response to determining the client application is not pre-installed on the client device:
   determine a version of the client application to be downloaded based on the analysis; and
   determine the networked source according to the version of the client application.

17. The system of claim 15, wherein the client application is a synchronization application.

18. The system of claim 15, wherein the activation module is further configured to:
   determine a configuration for the client application based on the analysis; and
   configure the client application prior to activation.

19. The system of claim 15, wherein the computing environment includes one or more of an operating system of the client device, a version of the operating system, a type of the client device, an available memory associated with the client device, an available storage associated with the client device, a processing capacity associated with the client device, and a network connectivity associated with the client device.

20. The system of claim 15, wherein the activation module is configured to interact with a user through a user interface of the cloud storage service.

* * * * *